United States Patent [19]

Umeda et al.

[11] Patent Number: 5,010,137

[45] Date of Patent: Apr. 23, 1991

[54] RUBBER COMPOSITION, AND OIL SEAL AND RUBBER HOSE OBTAINED THEREFROM

[75] Inventors: Itsuki Umeda, Tokyo; Masaaki Takashima, Tokyo; Yoshiaki Zama, Tokyo; Yasuhiko Takemura, Tokyo; Yuichi Funabashi, Gunma; Junichiro Watanabe, Gunma; Kiyoshi Takeda, Gunma; Makoto Matsumoto, Gunma, all of Japan

[73] Assignees: Japan Synthetic Rubber Co., Ltd.; Toshiba Silicone Co., Ltd., both of Tokyo, Japan

[21] Appl. No.: 156,118

[22] Filed: Feb. 16, 1988

[30] Foreign Application Priority Data

Feb. 16, 1987 [JP] Japan .................. 62-31401
Jul. 17, 1987 [JP] Japan .................. 62-177323

[51] Int. Cl.$^5$ ............................................. C08L 83/05
[52] U.S. Cl. ................................ 525/104; 525/100; 525/103; 525/105; 525/106; 525/288; 525/403; 525/474; 525/476
[58] Field of Search ............... 525/100, 103, 104, 106, 525/403, 105, 478, 474, 288

[56] References Cited

U.S. PATENT DOCUMENTS

| | | | |
|---|---|---|---|
| 3,021,191 | 0/1962 | Hurd et al. | 423/367 |
| 3,069,378 | 12/1962 | Prober et al. | 525/104 |
| 3,227,777 | 1/1966 | Safford | 525/209 |
| 3,288,879 | 11/1966 | Safford | 525/105 |
| 3,433,760 | 3/1969 | Clark et al. | 524/780 |
| 3,969,308 | 7/1976 | Penneck | 523/212 |
| 4,139,519 | 2/1979 | Itoh et al. | 525/105 |
| 4,150,010 | 4/1979 | Ito et al. | 524/566 |
| 4,201,698 | 5/1980 | Itoh et al. | 525/106 |
| 4,234,702 | 11/1980 | Nakamura | 525/100 |
| 4,303,572 | 12/1981 | Hatanaka et al. | 525/478 |
| 4,376,184 | 3/1983 | Itoh et al. | 524/492 |
| 4,714,734 | 12/1987 | Hashimoto et al. | 524/496 |

FOREIGN PATENT DOCUMENTS

| | | |
|---|---|---|
| 3314355 | 12/1983 | Fed. Rep. of Germany . |
| 54-24955 | 2/1979 | Japan . |
| 55-7814 | 1/1980 | Japan . |
| 55-71737 | 5/1980 | Japan . |
| 56-135584 | 10/1981 | Japan . |
| 57-195757 | 12/1982 | Japan . |
| 60-195149 | 10/1985 | Japan .................. 525/105 |
| 61-42541 | 3/1986 | Japan .................. 525/104 |
| 2019413 | 10/1979 | United Kingdom . |
| 2019417 | 10/1979 | United Kingdom . |
| 87/02996 | 5/1987 | World Int. Prop. O. . |

OTHER PUBLICATIONS

Patent Abstracts of Japan, vol. 5, No. 144 (C-71) [816], 11th Sep. 1981; & JP-A-56 76 441 (Dainichi Nippon Densen K. K.) (Cat. D) *Abstract*.
Patent Abstracts of Japan, vol. 4, No. 34 (C-3) [516], 22nd Mar. 1980; & JP-A-55 7814 (Toray Silicone K. K.) *Abstract*.
Patent Abstracts of Japan, vol. 10, No. 49 (C-330) [2106], 26th Feb. 1986; & JP-A-60 195 149 (Toushiba Silicone K. K.) *Abstract*.

Primary Examiner—John C. Bleutge
Assistant Examiner—Ralph H. Dean, Jr.
Attorney, Agent, or Firm—Oblon, Spivak, McClelland, Maier & Neustadt

[57] ABSTRACT

A rubber composition obtained by compounding (B) from 0.005 to 50 parts by weight of an polyorganohydrogensiloxane and (C) from 0.00001 to 1 part by weight of a compound of a transition metal belonging to the group VIII with (A) 100 parts by weight of a rubber-forming polymer mainly comprising (I) from 3 to 70% by weight of a polyorganosiloxane represented by the formula:

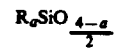

$$R_a SiO_{\frac{4-a}{2}}$$

wherein R represents a substituted or unsubstituted monovalent organic group, 0.02 to 10 mole % of which being a vinyl group; and a represents a number of from 1.900 to 2.004,
and having a degree of polymerization of from 500 to 10,000 and (II) from 30 to 97% by weight of organic rubber, and subjecting the resulting compound to hydrosilylation while effecting shear deformation. The rubber composition is excellent in roll processing properties, mechanical strength, heat resistance, and low-temperature property and is suitable as oil seal and rubber hose.

8 Claims, 0 Drawing Sheet

RUBBER COMPOSITION, AND OIL SEAL AND RUBBER HOSE OBTAINED THEREFROM

FIELD OF THE INVENTION

This invention relates to a rubber composition comprising a rubber-forming polymer comprising a polyorganosiloxane and an organic rubber, having compounded thereinto a polyorganohydrogensiloxane and a transition metal compound, and the invention relates also to an oil seal and a rubber hose obtained therefrom. More particularly, it relates to a rubber composition excellent in roll processing properties, mechanical strength, heat resistance, and low-temperature resistance, and the invention relates to an oil seal and a rubber hose obtained therefrom, the rubber composition being obtained by adding a polyorganohydrogensiloxane having hydrogensilicon bonds to the above-described rubber-forming polymer, followed by hydrosilylation in the presence of a transition metal compound as a catalyst while effecting shear deformation.

BACKGROUND OF THE INVENTION

Although silicone rubber is characterized by its excellent heat resistance, weather resistance, mold releasability, and the like, it is inferior in breaking strength, water resistance and impermeability to gases as compared with general organic rubber, i.e., synthetic rubbers mainly formed by carbon.

In an attempt of obtaining a rubber composition having excellent characteristics of silicone rubber combined with those of organic rubber, various studies on mixtures of these two types of rubber have hitherto been made. For example, it has been proposed to mechanically mix the both as disclosed in Japanese Patent Publication (Kokai) Nos. 41957/79, 139604/80, and 76444/81, or to bond a polyorganosiloxane to carbon-carbon double bonds of an organic rubber as disclosed in Japanese Patent Publication (Kokai) No. 157149/79, Japanese Patent Publication (Kokoku) No. 15497/80, and Japanese Patent Publication (Kokai) No. 31817/80, 76440/81, and 76441/81.

It is actually difficult, however, to mix a silicone rubber and an organic rubber, particularly oil-resistant organic rubber having a polar group, to obtain a uniform mixture due to poor compatibility therebetween. Moreover, a blend of components that are not co-vulcanizable with each other fails to attain satisfactory physical properties by vulcanization. Thus, none of the conventional proposals to combine silicone rubber and organic rubber has succeeded to bring out the characteristics inherently possessed by each of them.

SUMMARY OF THE INVENTION

Accordingly, an object of this invention is to provide a rubber composition which does not undergo phase separation owing to markedly improved microscopic mutual dispersibility between silicone rubber and organic rubber and exhibits excellent roll processing properties in an unvulcanized state.

Another object of this invention is to provide a crosslinkable rubber composition obtained from the above-described rubber composition which provides, upon crosslinking, an elastomer having excellent mechanical strength, heat resistance, low-temperature property, and oil resistance.

A further object of this invention is to provide an oil seal and a rubber hose obtained from the above-described crosslinkable rubber composition.

This invention relates to a rubber composition obtained by compounding (B) from 0.005 to 50 parts by weight of a polyorganohydrogensiloxane and (C) from 0.00001 to 1 part by weight of a compound of a transition metal belonging to the group VIII with (A) 100 parts by weight of a rubber-forming polymer mainly comprising (I) from 3 to 70% by weight of polyorganosiloxane represented by the formula:

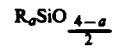

wherein R represents a substituted or unsubstituted monovalent organic group, 0.02 to 10 mole% of which being a vinyl group; and a represents a number of from 1.900 to 2.004, and having a polymerization degree of from 500 to 10,000 and (II) from 30 to 97% by weight of organic rubber, and subjecting the resulting compound to hydrosilylation while effecting shear deformation.

The present invention further relates to a crosslinkable rubber composition comprising the above-described rubber composition having compounded thereinto a crosslinking agent for the organic rubber (II), and the invention relates to an oil seal and a rubber hose obtained therefrom.

DETAILED DESCRIPTION OF THE INVENTION

The polyorganosiloxane (I) in the component (A) which can be used in the present invention mainly has a linear structure whose composition is represented by the above-described formula on the average, a part of which may have a branched chain or three-dimentional structure. It may be a homopolymer, a copolymer or a mixture thereof.

In formula $R_aSiO_{4-a/2}$, the organic group as represented by R includes, for example, methyl, ethyl, propyl, vinyl, and phenyl groups each of which may be substituted with a halogen atom. It is required that from 0.02 to 10 mole%, and preferably from 0.05 to 5 mole%, of the organic groups directly bonded to the silicon atom in the formula should be a vinyl group. If the vinyl group proportion is less than 0.02 mole%, the hydrosilylation reaction with the polyorganohydrogensiloxane hereinafter described would be insufficient so that the resulting rubber composition suffers deterioration of characteristics, such as roll processing properties, mechanical strength, heat resistance, low-temperature property, and the like. On the other hand, if the vinyl group proportion exceeds 10 mole%, the hydrosilylation reaction proceeds too rapidly, resulting in non-uniform kneading, which would adversely affect physical properties of the rubber composition.

The number represented by a in the above-described formula is selected from 1.900 to 2.004, and preferably from 1.950 to 2.002. If it is less than 1.900, mechanical strength and heat resistance of the resulting composition become poor. If it exceeds 2.004, a desired polymerization degree of the polyorganosiloxane cannot be obtained.

The polyorganosiloxane (I) has a polymerization degree of from 500 to 10,000, and preferably from 1,000 to 8,000. A polyorganosiloxane having a polymerization degree of less than 500 fails to provide a composition excellent in mechanical strength, and that which having a polymerization degree exceeding 10,000 is difficult to synthesize.

The molecular chain terminals of the polyorganosiloxane may be blocked with a hydroxyl group, an alkoxy group, a trimethylsilyl group, a dimethylvinylsilyl group, a methylphenylvinylsilyl group, a methyldiphenylsilyl group, etc.

The organic rubber (II) which can be used in the present invention includes a natural rubber, an isoprene rubber, a styrene-butadiene rubber, a butadiene rubber, a chloroprene rubber, a butyl rubber, an acrylonitrile-butadiene rubber, an ethylene-α-olefin rubber, a chlorosulfonated polyethylene, as well as a fluororubber, an acrylic rubber, an epichlorohydrin rubber, an ethylene-vinyl acetate rubber, an ethylene-acrylic rubber, etc.

Among them, preferred are an acrylic rubber, an ethylene-α-olefin rubber, an acrylonitrile-butadiene rubber, a fluororubber, an epichlorohydrin rubber, and chlorosulfonated polyethylene. In particular, an acrylic rubber, an acrylonitrile-butadiene rubber, an epichlorohydrin rubber, and a fluororubber are preferred from the standpoint of oil resistance. Further, an acrylic rubber is particularly suitable for obtaining a rubber composition having oil resistance, heat resistance, and low-temperature resistance.

The acrylic rubber includes a polymer of at least one alkyl (meth)acrylate and a copolymer mainly comprising at least one alkyl (meth)acrylate unit and a copolymerizable component having a crosslinkable group hereinafter described.

The alkyl (meth)acrylate includes ethyl (meth)acrylate, propyl (meth)acrylate, butyl (meth)acrylate, methoxyethyl (meth)acrylate, ethoxyethyl (meth)acrylate, etc.

The acrylic rubber may further comprise up to about 40% by weight of one or more other monomer units, such as acrylonitrile, styrene, 1,3-butadiene, isoprene, isobutylene, chloroprene, ethylene, propylene, vinyl acetate, acrylic acid, etc.

More specifically, the acrylic rubber preferably comprises an acrylic rubber (II-a) having an epoxy group, a halogen atom, a carboxyl group or a crosslinkable group represented by formula (i):

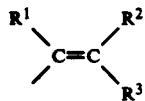

wherein $R^1$, $R^2$, and $R^3$ each represents a hydrogen atom or a monovalent or divalent organic group, and an acrylic rubber (II-b) having a crosslinkable group represented by formula (ii):

wherein $R^4$ represents a methylene group, —O—, —S—,

or —NH—; R represents a substituted or unsubstituted monovalent organic group, and $R^5$, $R^6$, and $R^7$ each represents a hydrogen atom or a mono- to trivalent organic group, and at least two of $R^5$, $R^6$, and $R^7$ are hydrogen atoms.

The acrylic rubber (II-b) has possibility of reacting with polyorganosiloxane (I) or polyorganohydrogensiloxane (B).

Examples of the comonomer providing the crosslinkable group of formula (i) are vinyl chloroacetate, allyl chloroacetate, 2-chloroethyl vinyl ether, allyl glycidyl ether, glycidyl methacrylate, acrylic acid, methacrylic acid, maleic acid, fumaric acid, itaconic acid, 5-ethylidene-2-norbornene, etc. and combinations of two or more thereof.

Examples of the comonomer providing the crosslinkable group of formula (ii) are dicyclopentadiene, vinyl acrylate, allyl methacrylate, dicyclopentenyl acrylate, dicyclopentenyloxylethyl acrylate, p-vinylphenyl(-dimethyl)vinylsilane, 3-methacryloxypropyldimethylvinylsilane, etc.

The acrylic rubber (II-b) may further comprise the same crosslinkable group-containing unit as used in the acrylic rubber (II-a).

The above-described crosslinkable comonomer is used in an amount of not more than 15% by weight, preferably not more than 10% by weight, and more preferably from 0.01 to 5% by weight, based on the alkyl (meth)-acrylate.

The acrylic rubber (II-a) is preferably used in a proportion of from 50 to 95% by weight, and more preferably from 60 to 90% by weight, based on the total of (II-a) and (II-b), with the acrylic rubber (II-b) being 5 to 50% by weight, and more preferably from 10 to 40% by weight. If the (II-b) component exceeds 50% by weight, the resulting composition tends to be too much crosslinked to be processed. On the other hand, if the (II-a) component exceeds 95% by weight, the improving effect on low-temperature property would be poor.

The above-described organic rubber suitably has a Mooney viscosity (ML$_{1+4}$, 100° C.) of from 10 to 200, preferably from 20 to 150, and more preferably from 30 to 100, in view of uniform dispersibility or kneading properties when mixed with the polyorganosiloxane (I). By using the organic rubber having such a viscosity, stable quality and characteristics of the resulting rubber composition can be assured. Organic rubber having a Mooney viscosity out of the above-recited range is poor in kneading properties or dispersibility, resulting in difficulty of maintaining characteristics, such as low-temperature property, heat resistance, and the like, of vulcanized rubber.

A mixing ratio of the polyorganosiloxane (I) to organic rubber (II) in the component (A) is 3:97 to 70:30, and preferably 5:95 to 50:50, by weight. If the proportion of the component (I) is too small, when the polyorganohydrogensiloxane (B) is added thereto and the mixture is kneaded in the presence of the group VIII metal compound (C) while applying shear deformation, hydrosilylation reaction does not sufficiently occur thus failing to provide the desired composition. If it is too great, the resulting composition would have impaired processability and low mechanical strength due to excessive crosslinking.

The polyorganohydrogensiloxane (B) having hydrogen-silicon bonds in the molecule thereof is not particularly limited in structure, but preferably contains at least two hydrogen-silicon bonds per molecule in order to assure hydrosilylation with the polyorganosiloxane (I) to cause crosslinking. Examples of such polyorganohydrogensiloxane are shown below.

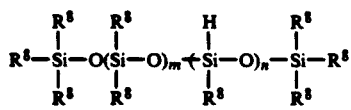

(wherein $R^8$ represents an alkyl group having from 1 to 18 carbon atoms; $m \geq 0$; and $n \geq 2$),

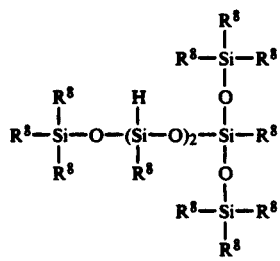

(wherein $R^8$ is as defined above),

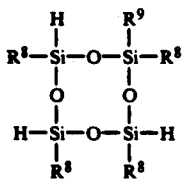

(wherein $R^8$ is as defined above; and $R^9$ represents a butyl group or a phenyl group),

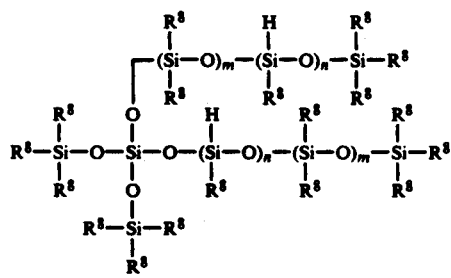

(wherein $R^8$, m, and n are as defined above),

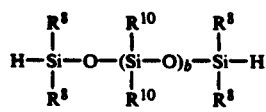

(wherein $R^8$ is as defined above; $R^{10}$ represents a methyl group or a phenyl group; and $b \geq 0$),

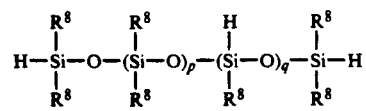

(wherein $R^8$ is as defined above; $p \geq 0$; and $q \geq 1$), and

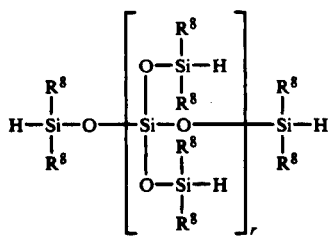

(wherein $R^8$ is as defined above; and $r \geq 4$).

The polyorganohydrogensiloxane (B) is used usually in an amount of from 0.005 to 50 parts by weight, preferably from 0.01 to 30 parts by weight, and more preferably from 0.02 to 20 parts by weight, per 100 parts by weight of the rubber-forming polymer (A). If the amount of the component (B) is less than 0.005 part by weight, the hydrosilylation reaction would be insufficient. On the other hand, if it exceeds 50 parts by weight, the resulting composition would have a reduced viscosity, which leads to reduction in strength.

The rubber composition according to the present invention can be obtained by compounding the polyorganohydrogensiloxane (B) and the compound (C) of a transition metal belonging to the group VIII hereinafter described, into the rubber-forming polymer (A) comprising the polyorganosiloxane (I) and the organic rubber (II), whereby the component (C) acts as a catalyst to cause hydrosilylation between the component (B) and the polyorganosiloxane (I).

By the hydrosilylation reaction, the components (B) and (I) form a network structure, and the networked high polymer and the component (II) are microscopically entangled with each other to thereby form a stably dispersed mixture. In this entanglement, it is preferable that the networked high polymer reacts with a part of the component (II). The thus obtained microscopic dispersibility between the networked high polymer and the component (II) produces various effects as hereinafter described.

The above-described networked high polymer preferably has an average particle size of not more than 20 μm, more preferably not more than 10 μm, and most preferably not more than 5 μm, from the standpoint of low-temperature property. Further, the networked high polymer preferably has a toluene isoluble matter of not less than 30% by weight, and more preferably not less than 50% by weight, from the standpoint of bleed prevention and good processability.

The transition metal compound (C) is not particularly restricted in so far as it catalyzes hydrosilylation. Examples of the transition metal compounds to be used include $Fe(CO)_5$, $Co(CO)_8$, $RuCl_3$, $IrCl_3$, a $[(olefin)PtCl_2]_2$, a vinyl group-containing polysiloxane-Pt complex, $H_2PtCl_6 \cdot 6H_2O$, and compounds represented by formulae $L_3RhCl_3$, $L_2Ni(olefin)$, $L_4Pd$, $L_4Pt$, $L_2NiCl_2$, and $L_2PdCl_2$, wherein L represents $PPh_3$ or $PR'_3$, wherein Ph represents a phenyl group; and R' represents an alkyl group. Preferred of them are platinum compounds.

The amount of the component (C) to be added varies depending on the vinyl group content in the polyorganosiloxane (I) and the hydrogen-silicon bond content in the polyorganohydrogensiloxane (B), and usually ranges from about 0.00001 to 1 part by weight, and preferably from about 0.0001 to 0.5 part by weight, per 100 parts by weight of the component (A). In case of platinum compounds, component (C) is preferably added in an amount of from about 5 to 1,000 ppm on platinum atom basis. If it is less than 0.00001 part by weight, hydrosilylation does not sufficiently proceed, failing to ensure sufficient roll processing properties, mechanical strength, heat resistance and low-temperature property of the resulting composition. An amount exceeding 1 part by weight does not bring about any further improvement on roll processing properties and, rather, weakened mechanical strength, heat resistance, and the like.

In preparing the rubber composition according to the present invention, the method or order of adding the above-described components, the method of kneading, and the apparatus for kneading are not particularly limited. For example, the composition can be prepared by a method comprising kneading the components (I) and (II) either simultaneously or successively in a kneading machine, e.g., a Banbury mixer, a kneader, a two-roll mill, etc., to soften the components, adding the component (B) to the blend, followed by kneading, and finally kneading the component (C) therewith; a method comprising previously kneading the components (I), (II), and (B) in the above-described kneading machine to once prepare a homogeneous mixture and then kneading the compound (C) therewith; a method comprising previously compounding fillers into the component (II) and then adding other components thereto; or a method comprising kneading the component (A) having previously compounded thereinto reinforcing fillers, e.g., fumed silica, wet processed silica, etc., and other additives, such as heat stabilizers, with the component (B) in the above-described kneading machine and then adding the component (C) to the blend, followed by kneading.

The transition metal compound (C) is usually added as diluted with various organic solvents or with organic rubber (II). In this case, the addition of the component (C) is usually effected at a temperature of from 10° to 200° C., and preferably from 20° to 120° C.

If desired, the rubber composition of the present invention may further contain, in addition to the components (A) to (C), conventionally known additives commonly employed in natural or synthetic rubber including silicone rubber, such as reinforcing agents, fillers, extenders, processing aids, plasticizers, softeners, antioxidants, heat stabilizers, coloring agents, ultra-violet absorbents, flame-retardants, oil-resistance improving agents, foaming agents, scorch retarders, tackifiers, lubricants, and the like.

The reinforcing agents, fillers and extenders to be added include fumed silica, wet processed silica, quartz fine powder, diatomaceous earth, carbon black, zinc white, basic magnesium carbonate, activated calcium carbonate, magnesium silicate, aluminum silicate, titanium dioxide, talc, mica powder, aluminum sulfate, calcium sulfate, barium sulfate, asbestos, glass fibers, and organic fillers. The processing aids include metal oxides, amines, and fatty acids and derivatives thereof.

The plasticizers include polydimethylsiloxane oil, diphenylsilanediol, trimethylsilanol, phthalic acid derivatives, and adipic acid derivatives. The softeners include lubricating oils, process oils, coal tar, castor oil, and calcium stearate. The antioxidants include phenylenediamines, phosphates, quinolines, cresols, phenols, and metal dithiocarbamates. The heat stabilizers include iron oxides, cerium oxide, potassium hydroxide, iron naphthenate, and potassium naphthenate.

These compounding additives may be added either during the preparation of the rubber composition or after that, i.e., during the subsequent step for preparing a crosslinkable rubber composition from the resulting composition.

To the compounded rubber composition thus obtained may be added a crosslinking agent for the organic rubber component (II) and the like by means of a general kneading machine, e.g., a roll mill, a Banbury mixer, etc., to obtain a crosslinkable rubber composition which can be molded and vulcanized.

In carrying out crosslinking of the crosslinkable rubber composition, a crosslinking accelerator, a crosslinking aid, a supplement accelerator, a crosslinking retarder, and the like may be used in combination, if necessary.

The crosslinking can be effected by application of energy, such as heat, electron beam, ultraviolet rays, electromagnetic waves, and the like.

The crosslinking agent which can be used in the present invention includes sulfur or sulfur derivatives commonly employed as vulcanizing agent for rubber, organic peroxides, alkylphenol resins, ammonium benzoate, and the like. Polyfunctional crosslinking agents having two or more functional groups reactive with the crosslinkable group contained in the organic rubber (II) can also be used.

Specific examples of the organic peroxides to be used as crosslinking agent are 2,5-dimethyl-2,5-di(t-butylperoxy)hexyne-3, 2,5-dimethyl-2,5-di(t-butylperoxy)hexane, 2,2'-bis(t-butylperoxy)-p-diisopropylbenzene, dicumyl peroxide, di-t-butyl peroxide, t-butyl perbenzoate, 1,1-bis(t-butylperoxy)-3,3,5-trimethylcyclohexane, 2,4-dichlorobenzoyl peroxide, benzoyl peroxide, p-chlorobenzoyl peroxide, azobisisobutyronitrile, etc., with 2,5-dimethyl-2,5-di(t-butylperoxy)hexyne-3, 2,5-dimethyl-2,5-di(t-butylperoxy)hexane, and 2,2'-bis-(t-butylperoxy)-p-diisopropylbenzene being preferred.

The polyfuncitonal crosslinking agents having two or more functional groups reactive with the crosslinkable group in the organic rubber (II) preferably include those having two or more functional groups selected from the group consisting of amino, isocyanate, maleimide, epoxy, hydroxyl, and carboxyl groups. Such polyfunctional crosslinking agents include diamines, polyamines, diisocyanates, polyisocyanates, maleimides, diepoxides, diols, polyols, bisphenols, dicarboxylic acids, and the like. Specific examples of these compounds are N,N'-phenylenedimaleimide, hexamethylenediamine, 2,2-bis(4'-hydroxyphenyl)propane, 2,2-bis(4'-hydroxyphenyl)hexafluoropropane, etc.

In cases where an elastomer having introduced therein an epoxy group is used as the organic rubber (II), it is possible to use, as crosslinking agents, polyamine carbamates, ammonium salts of organic carboxylic acids, or dithiocarbamates.

In cases where an elastomer having introduced therein a halogen group is used as the organic rubber (II), polyamine carbamates, ammonium salts of organic carboxylic acids, or alkali metal salts of organic carboxylic acids can also be used as crosslinking agent.

The amount of the crosslinking agent to be added ranges from 0.1 to 5 parts by weight, and preferably from 0.5 to 3 parts by weight, in the case of sulfur; from 0.01 to 10 parts by weight, and preferably from 0.1 to 5 parts by weight, in the case of the organic peroxides; or from 0.01 to 10 parts by weight, and preferably from 0.1 to 5 parts by weight, in the case of the polyfunctional crosslinking agents, per 100 parts by weight of the rubber composition. If the amount of the crosslinking agent is too small, mechanical strength, oil resistance, and creep resistance of the resulting vulcanizate are insufficient due to a low crosslink density. On the other hand, too great amount of the crosslinking agent results in too high crosslink density providing the vulcanizate with poor elongation.

In carrying out the crosslinking, if desired, a bifunctional vinyl monomer, and the like may be used as a crosslinking aid. Specific examples of such a crosslinking aid include ethylene glycol dimethacrylate, 1,3-butanediol dimethacrylate, 1,4-butanediol dimethacrylate, 1,6-hexanediol dimethacrylate, polyethylene glycol dimethacrylate, 1,4-butanediol diacrylate, 1,6-hexanediol diacrylate, 2,2-bis(4'-methacryloyloxydiethoxyphenyl)propane trimethylolpropane trimethacrylate, trimethylolpropane triacrylate, pentaerythritol triacrylate, divinylbenzene, N,N'-methylenebisacrylamide, p-quinone dioxime, p,p'-dibenzoylquinone dioxime, triazinedithiol, triallyl cyanurate, triallyl isocyanurate, bismaleimide, etc.

The crosslinkable rubber composition can generally be crosslinked (i.e., vulcanized) through primary vulcanization at 80° to 200° C. for several minutes to 3 hours under a pressure of 20 to 200 kg/cm$^2$ and, if desired, through secondary vulcanization at 80° to 200° C. for 1 to 48 hours.

As described above, the rubber composition according to the present invention does not undergo phase separation even after elapse of time, which is observed in a mere blend of silicone rubber and organic rubber.

Further, the rubber composition of the present invention exhibits markedly improved roll processing properties. That is, when a crosslinking agent, a crosslinking accelerator, etc. are added to the rubber composition by the use of a roll mill, the composition of the present invention can be instantaneously banded around a roll with no fall-off, whereas a mere blend of silicone rubber and organic rubber, inclusive of a rubber composition containing additives such as filler requires much time for roll band.

A vulcanized rubber obtained by crosslinking (vulcanizing) the crosslinkable rubber composition of the present invention exhibits excellent mechanical strength, good heat resistance, good low-temperature property and good oil resistance and is, therefore, widely applicable to the general industry and the chemical field. The crosslinkable rubber composition having such characteristics when vulcanized is particularly suitable for application to oil seals and rubber hoses.

When the crosslinkable rubber composition is used as oil seal or hose, it is preferable that the networked high polymer composed of the polyorganosiloxane (I) and the polyorganohydrogensiloxane (B) in the composition has an average particle size of not more than 20 °m.

When the crosslinkable rubber composition is applied to rubber hoses, it is used as an inner and/or outer layer(s) thereof. In this case, the hose may further comprise a reinforcing fabric layer or a general rubber layer as intermediate layer between the inner and outer layers. The reinforcing material to be used in the reinforcing fabric layer includes vinylon, nylon, polyester, aramide fiber, carbon fiber, wire, etc.

The outer layer of the rubber hose may be made of general rubbery materials other than the rubber composition of this invention, such as synthetic rubber, e.g., chloroprene rubber, chlorosulfonated polyethylene, epichlorohydrin rubber, ethyelne-acrylic ester copolymer rubber, etc.

EXAMPLES OF THE INVENTION

The present invention is now illustrated in greater detail with reference to Reference Examples, Examples and Comparative Examples, but it should be understood that the present invention is not limited thereto. All the parts and percents in the following description are by weight unless otherwise indicated.

In Examples, various properties of the rubber compositions were evaluated or determined according to the following test methods unless otherwise noted.

1. Roll Processing Properties (a) Banding Time

A compounded rubber composition was placed on 6-inch rolls adjusted to have a surface temperature of 50° C., a rotation of 20 (first roll) and 28 (back roll) per minute, and a nip of 2 mm. The time required for the composition to completely band around a roll was measured.

(b) Bleeding of Polyorganosiloxane

A rubber composition sheet obtained after the roll band property test described in (a) was allowed to stand at room temperature for 16 hours, and the surface gloss of the sheet was visually observed if polyorganosiloxane is bleeding or not.

2. Initial Physical Properties

The rubber composition was vulcanized by press at 170° C. for 20 minutes and then post cured in an oven at 175° C. for 4 hours. The vulcanizate was evaluated for tensile strength at break, elongation at break and hardness according to JIS K 6301. Hardness was measured by JIS A hardness tester.

3. Aging Properties

The vulcanized rubber composition was aged in a Geer oven at 175° C. for 70 hours and then evaluated for tensile strength at break, elongation at break and hardness according to JIS K 6301.

4. Impact Brittleness Test at low Temperature

Brittle temperature was measured according to JIS K 6301.

5. Resistance to Engine Oil

The vulcanized rubber composition was immersed in an engine oil of SF grade (SAE viscosity number: 10W-40) at 150° C. for 300 hours, and a change in tensile strength, elongation, hardness, and volume was measured according to JIS K 6301.

6. Oil Resistance

The vulcanized rubber composition was immersed in JIS #3 oil at 150° C. for 70 hours, and a volume change was measured according to JIS K 6301.

7. Heat Resistance of Rubber Hose

A rubber hose (Outside diameter: 13 mm; Inside diameter: 7 mm; length: 200 mm) comprising outer and inner rubber layers and a knitted polyester reinforcing fiber layer as intermediate layer was aged in a Geer oven at 200° C. for 70 hours. After the hose was allowed to stand at room temperature for 3 hours, it was rapidly bent 90°, and generation of cracks was observed.

8. Low-Temperature Resistance of Rubber Hose

The same specimen as prepared for the heat resistance test was cooled to −40° C. for 5 hours. The hose was bent 180° around a cylindrical tube having a radius of 38 mm within 4 seconds, and generation of cracks was observed.

Heat resistance and low-temperature resistance of rubber hoses were rated as follows:

Good: No abnormality, such as fractures, cracks, checks or breaks, was observed.

Poor: Fractures, cracks, checks, or breaks were observed.

REFERENCE EXAMPLE 1

Into 100 parts of linear polymethylvinylsiloxane represented by the formula $R_aSiO_{4-1/2}$ wherein 0.1 mole% of the organic groups as represented by R bonded to silicon atoms are vinyl groups with the rest being methyl groups and a is 2.000 and having an average polymerization degree of 6,000, were compounded 35 parts of silica fine powder having been rendered hydrophobic by surface treatment with polysiloxane, in a kneader to obtain a homogeneous silicone rubber composition (i).

EXAMPLES 1 TO 3

A norbornene type acrylic rubber ("AR 101" produced by Japan Synthetic Rubber Co., Ltd.) as organic rubber, the silicone rubber composition (i) as prepared in Reference Example 1, and linear, trimethylsilylterminated polymethylhydrogensiloxane (ii) compound of 20 methylhydrogensiloxane units as polyorganohydrogen-siloxane, in a composition ratio shown in table 1, were successively charged in a rubber mixer and kneaded at 60° to 80° C. and at 60 rpm. When the mixture become uniform, an isopropanol solution containing 1% of chloroplatinic acid was added thereto, followed by further kneading. After the mixture became uniform, the composition was withdrawn. The temperature of the rubber composition at the time of withdrawal was between 150° and 200° C. to roll processing property test and bleeding test.

Then, the sheet was again band around a roll in a two-roll mill, and other additives shown in Table 1 were kneaded therewith. The resulting compounded rubber composition was subjected to press vulcanization and post cure. Various physical properties of the resulting composition were determined, and the results obtained are shown in Table 1.

EXAMPLE 4

A crosslinkable rubber composition was prepared in the same process as in Example 1, following a composition ratio shown in Table 1, using an ethylene-propylene rubber ("EP 43" produced by Japan Synthetic Rubber Co., Ltd.) as an organic rubber. Evaluation were made on the resulting rubber composition, and the results obtained are shown in Table 1.

EXAMPLE 5

A crosslinkable rubber composition was prepared in the same process as in Example 1, following a composition ratio shown in Table 1, using a nitrile rubber ("N 230 S" produced by Japan Synthetic Rubber Co., Ltd.) as an organic rubber. Evaluations were made on the resulting rubber composition, and the results obtained are shown in Table 1.

EXAMPLE 6

A crosslinkable rubber composition was prepared in the same process as in Example 1, following a composition ratio shown in Table 1, using a fluororubber ("Aflas 150P", a tetrafluoroethylene-propylene copolymer, produced by Japan Synthetic Rubber Co., Ltd.) as an organic rubber. Evaluation were made on the resulting composition, and the results are shown in Table 1.

EXAMPLE 7

A crosslinkable rubber composition was prepared in the same process as in Example 1, following a composition ratio shown in Table 1, using an ethylene-acrylic ester copolymer rubber ("VAMAC B 124", a carboxylic curing site containing ethylenemethylacrylate copolymer, produced by E.I. Du Pont de Nemours & Co., Ltd.) as an organic rubber. Evaluations were made on the resulting rubber composition, and the results obtained are shown in Table 1.

EXAMPLE 8

A crosslinkable rubber composition was prepared in the same process as in Example 1, following a composition ratio shown in Table 1, using a linear polymethylvinylsiloxane represented by the formula $R_aSiO_{4-a/2}$ wherein 0.05 mole% of the organic groups as represented by R bonded to silicon atoms are vinyl groups with the rest being methyl groups and a is 2.000 and having an average polymerization degree of 4,500 as a polyorganosiloxane. Evaluations were made on the resulting composition, and the results obtained are shown in Table 1.

COMPARATIVE EXAMPLES 1 TO 6

Rubber compounds were prepared in the same manner as in Example 1 to 2 and 4 to 7, except that the polyorganohydrogensiloxane (ii) and/or the isopropanol solution of chloroplatinic acid was/were not compounded. Evaluations were made on the resulting rubber compounds, and the results obtained are shown in Table 1.

TABLE 1

| | Example No. | | | | | | | | Comparative Example No. | | | | | |
|---|---|---|---|---|---|---|---|---|---|---|---|---|---|---|
| | 1 | 2 | 3 | 4 | 5[9] | 6 | 7 | 8 | 1 | 2 | 3 | 4[9] | 5 | 6 |
| Composition (part by wt.): | | | | | | | | | | | | | | |
| Component (I): | | | | | | | | | | | | | | |

TABLE 1-continued

|  | Example No. | | | | | | | | Comparative Example No. | | | | | |
| --- | --- | --- | --- | --- | --- | --- | --- | --- | --- | --- | --- | --- | --- | --- |
|  | 1 | 2 | 3 | 4 | 5[9] | 6 | 7 | 8 | 1 | 2 | 3 | 4[9] | 5 | 6 |
| Silicone Rubber Composition (i) | 30 | 50 | 30 | 20 | 30 | 20 | 30 | — | 30 | 50 | 20 | 30 | 20 | 30 |
| Linear polymethylvinylsiloxane[1] | — | — | — | — | — | — | — | 30 | — | — | — | — | — | — |
| Component (II): | | | | | | | | | | | | | | |
| EP 43 | — | — | — | 80 | — | — | — | — | — | — | 80 | — | — | — |
| Aflas 150 P | — | — | — | — | — | 80 | — | — | — | — | — | — | 80 | — |
| VAMAC B 124 | — | — | — | — | — | — | 70 | — | — | — | — | — | — | 70 |
| AR 101 | 70 | 50 | 70 | — | — | — | — | 70 | 70 | 50 | — | — | — | — |
| N 230 S | — | — | — | — | 70 | — | — | — | — | — | — | 70 | — | — |
| Component (B): | 5 | 5 | 5 | 5 | 5 | 4 | 5 | 5 | — | 5 | — | — | — | — |
| Polymethylhydrogensiloxane (ii) | | | | | | | | | | | | | | |
| Component (C): | 0.4 | 0.4 | 0.4 | 0.2 | 0.3 | 0.2 | 0.4 | 0.4 | — | — | — | — | — | 0.4 |
| 1% isopropanol solution of chloroplatinic acid | | | | | | | | | | | | | | |
| Other Additives: | | | | | | | | | | | | | | |
| Stearic acid | 1 | 1 | 1 | 1 | 1 | — | — | 1 | 1 | 1 | 1 | 1 | — | — |
| Silica[2] | 30 | 30 | — | 30 | 30 | 20 | 30 | 30 | 30 | 30 | 30 | 30 | 20 | 20 |
| Process Oil[3] | — | — | — | 10 | — | — | — | — | — | — | 10 | — | — | — |
| Peroxide[4] | 2 | 2 | 2 | 3 | 2 | 3 | — | 2 | 2 | 2 | 3 | 2 | 3 | — |
| Sulfur | — | — | — | 0.2 | — | — | — | — | — | — | 0.2 | — | — | — |
| Crosslinking aid[5] | — | — | — | — | — | 5 | — | — | — | — | — | — | 5 | — |
| Carbon black[6] | — | — | 50 | — | — | — | — | — | — | — | — | — | — | — |
| Vulcanizing agent[7] | — | — | — | — | — | — | 1 | — | — | — | — | — | — | 1 |
| Vulcanization accelerator[8] | — | — | — | — | — | — | 4 | — | — | — | — | — | — | 4 |
| Results of Evaluations: | | | | | | | | | | | | | | |
| Roll Processing Properties: | | | | | | | | | | | | | | |
| Banding Time (min) | 0.5 | 0.5 | 0.4 | 0.5 | 0.5 | 1 | 0.5 | 0.5 | 10 | 8 | 12 | 15 | 20 | 10 |
| Bleeding of Polyorganosiloxane | none | none | none | none | none | none | none | none | bleeding observed | | | | | |
| Initial Physical Properties: | | | | | | | | | | | | | | |
| Tensile Strength (kgf/cm$^2$) | 120 | 95 | 165 | 155 | 155 | 100 | 165 | 123 | 80 | 60 | 130 | 110 | 70 | 130 |
| Elongation (%) | 350 | 280 | 480 | 390 | 390 | 350 | 400 | 360 | 340 | 250 | 400 | 300 | 320 | 380 |
| Aging Properties: | | | | | | | | | | | | | | |
| Tensile Strength (kgf/cm$^2$) | 100 | 80 | 148 | 110 | 110 | 98 | 150 | 105 | 60 | 40 | 95 | 40 | 50 | 105 |
| Elongation (%) | 290 | 220 | 400 | 320 | 320 | 350 | 350 | 320 | 100 | 50 | 250 | 70 | 230 | 280 |
| Brittle Temperature (°C.) | −30 | −49 | −35 | <−60 | −43 | −50 | −45 | −32 | −20 | −40 | <−60 | −35 | −40 | −35 |

Note:
[1]Linear polymethylvinylsiloxane, in which 0.05 mole % of the organic groups bonded to Si atoms are vinyl groups with the rest being methyl groups, having an average degree of polymerization of 4,500.
[2]"Nipsil VN3" produced by Nippon Silica Industrial Co., Ltd.
[3]"PW-380" produced by Idemitsu Kosan Co., Ltd.
[4]"Percadox 14/40" produced by Kayaku Noury Co., Ltd.
[5]Triallyl isocyanurate
[6]"Seast SO" produced by Tokai Carbon Co., Ltd.
[7]"Diak No. 1" produced by E. I. Du Pont de Nemours & Co., Ltd.
[8]"Nocceler D" produced by Ouchi Shinko Kagaku Co., Ltd.
[9]Vulcanization was carried out only by press vulcanization at 170° C. for 20 minutes, and aging was effected in a Geer oven at 120° C. for 70 hours.

EXAMPLE 9

A crosslinkable rubber composition was prepared in the same manner as in Example 1, except for using, as component (B), 7.5 parts of a polyorganohydrogensiloxane represented by the formula H(CH$_3$)$_2$SiO[(CH$_3$)$_2$SiO]$_{10}$−[(CH$_3$)HSiO]$_8$Si(CH$_3$)$_2$H per 100 parts of the component (A). The resulting composition was subjected to the following test: roll processing properties, initial physical properties, aging properties, and brittle temperature. The results obtained are shown in Table 2.

EXAMPLE 10

A crosslinkable rubber composition was prepared in the same manner as in Example 1, except for using as component (B), 4 parts of a polyorganohydrogensiloxane represented by the formula:

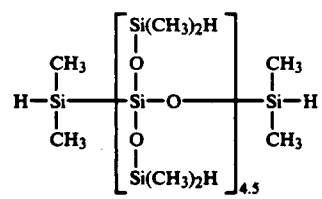

per 100 parts of the component (A). Evaluations on the same items as in Example 9 were made, and the results obtained are shown in Table 2.

EXAMPLE 11

A crosslinkable rubber composition was prepared in the same manner as in Example 1, except for using 0.4 parts of a 1% solution of chloroplatinic acid-octene complex in a 1:1 (by weight) mixture of toluene and isopropanol as component (C) per 100 parts of the component (A). Evaluations were made in the same manner as in Example 9, and the results obtained are shown in Table 2.

EXAMPLE 12

A crosslinkable rubber composition was prepared in the same manner as in Example 1, except for using 7 parts of an polyorganohydrogensiloxane of the formula:

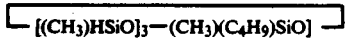

as component (B) and the same amount of the same platinum compound as used in Example 11 as component (C), and changing the kneading temperature to 50° through 60° C. Evaluations were made in the same manner as in Example 9, and the results obtained are shown in Table 2.

COMPARATIVE EXAMPLE 7

A rubber compound was prepared in the same manner as in Example 1, except for using, as polyorganosiloxane, a linear polymethylsiloxane represented by the formula $Ra_aSiO_{4-a/2}$ wherein all the organic groups bonded to silicon atoms are methyl groups and a is 2.000 and having an average polymerization degree of 6,000. Evaluations were made in the same manner as in Example 9, and the results obtained are shown in Table 2.

TABLE 2

| | Example No. | | | | Comparative Example 7 |
|---|---|---|---|---|---|
| | 9 | 10 | 11 | 12 | |
| Roll Processing Properties: | | | | | |
| Banding Time (min) | 0.4 | 0.5 | 0.5 | 0.5 | 25 |
| Bleeding of Polyorganosiloxane | none | none | none | none | bleeding observed |
| Initial Physical Properties: | | | | | |
| Tensile Strength (kgf/cm$^2$) | 110 | 120 | 120 | 110 | 80 |
| Elongation (%) | 360 | 360 | 350 | 340 | 290 |
| Aging Properties: | | | | | |
| Tensile Strength (kgf/cm$^2$) | 98 | 100 | 105 | 92 | 50 |
| Elongation (%) | 300 | 310 | 300 | 280 | 150 |
| Brittleness Temperature (°C.) | −30 | −30 | −30 | −28 | −20 |

EXAMPLES 13 TO 14 AND COMPARATIVE EXAMPLES 8 TO 9

Crosslinkable rubber compositions (Examples) and rubber compounds (Comparative Examples) were prepared in the same manner as in Example 1, except for varying the vinyl group content in the organic groups bonded to silicon atoms and the average polymerization degree of the polyorganosiloxane as indicated in Table 3. Evaluations were made in the same manner as in Example 9, and the results obtained are shown in Table 3.

TABLE 3

| | Example No. | | Comparative Example No. | |
|---|---|---|---|---|
| | 13 | 14 | 8 | 9 |
| Polyorganosiloxane: | | | | |
| Vinyl Group Content in Organic Groups (mole %) | 1.0 | 4.0 | 15 | 1.0 |
| Average Polymerization Degree | 6000 | 5000 | 6000 | 400 |
| Roll Processing Properties: | | | | |
| Time for Roll band (min) | 0.3 | 0.2 | 0.5 | 1.0 |
| Bleeding of Polyorganosiloxane | none | none | none | none |
| Initial Physical Properties: | | | | |
| Tensile Strength (kgf/cm$^2$) | 118 | 125 | 75 | 80 |
| Elongation (%) | 340 | 330 | 230 | 250 |
| Aging Properties: | | | | |
| Tensile Strength (kgf/cm$^2$) | 105 | 109 | 65 | 48 |
| Elongation (%) | 300 | 290 | 280 | 200 |
| Brittleness Temperature (°C.) | −33 | −36 | −27 | −28 |

EXAMPLES 15 TO 16

Crosslinkable rubber compositions were prepared in the same manner as in Example 1, except for changing the composition as indicated in Table 4. Evaluations were made in the same manner as in Example 9, and the results obtained are shown in Table 4.

TABLE 4

| | Example No. | |
|---|---|---|
| | 15 | 16 |
| Composition (part): | | |
| Component (I) (the same as in Example 8) | 30 | 30 |
| Component (II): | | |
| AR 101 | 70 | — |
| Acrylic rubber[1] | — | 70 |
| Component (B) (the same as in Example 1) | 8 | 2 |
| Component (C) (the same as in Example 1) | 0.4 | 0.2 |
| Stearic acid | 1 | 1 |
| Zinc oxide | 5 | — |
| Carbon black[2] | 50 | 40 |
| Vulcanizing agent[3] | 0.5 | — |
| Vulcanizing agent[4] | — | 1.5 |
| Vulcanization accelerator[5] | 2 | — |
| Roll Processing Properties: | | |
| Banding Time (min) | 0.4 | 0.5 |
| Bleeding of Polyorganosiloxane | none | none |
| Initial Physical Properties: | | |
| Tensile Strength (kgf/cm$^2$) | 170 | 165 |
| Elongation (%) | 350 | 290 |
| Aging Properties: | | |
| Tensile Strength (kgf/cm$^2$) | 175 | 155 |
| Elongation (%) | 290 | 250 |
| Brittleness Temperature (°C.) | −28 | −26 |

Note:
[1] An ethyl acrylate/allyl glycidyl ether copolymer (98/2 by mole) having a molecular weight of 500,000.
[2] "Seast 3" produced by Tokai Carbon Co., Ltd.
[3] Powderous sulfur, produced by Tsurumi Kagaku Kogyo Co., Ltd.
[4] "Vulnoc AB", produced by Ouchi Shinko Kagaku Co., Ltd.
[5] "Nocceler TT", produced by Ouchi Shinko Kagaku Co., Ltd.

COMPARATIVE EXAMPLE 10

A rubber compound was prepared in the same manner as in Example 1, except for changing the amount of the component (B) to 55 parts. Results of evaluations are shown in Table 5.

COMPARATIVE EXAMPLE 11

A rubber compound was prepared in the same manner as in Example 1, except for changing the weight ratio of the component (I) to component (II) to 80/20. Results of evaluations are shown in Table 5.

TABLE 5

|  | Comparative Example 10 | Comparative Example 11 |
|---|---|---|
| Roll Processing Properties: | | |
| Banding Time (min) | 0.8 | 1.5 |
| Bleeding of Polyorganosiloxane | none | none |
| Initial Physical Properties: | | |
| Tensile Strength (kgf/cm$^2$) | 65 | 48 |
| Elongation (%) | 280 | 200 |
| Aging Properties: | | |
| Tensile Strength (kgf/cm$^2$) | 39 | 35 |
| Elongation (%) | 185 | 150 |
| Brittleness Temperature (°C.) | −32 | −30 |

REFERENCE EXAMPLE 2

| Monomer mixture: | |
|---|---|
| Ethyl acrylate | 98 parts |
| Allyl methacrylate | 2 parts |
| Water | 250 parts |
| Sodium dodecylbenzenesulfonate | 5 parts |
| Sodium t-dodecylmercaptane | 0.1 to 0.5 part |
| Ferrous phosphate | 0.3 part |
| Ferrous sulfate | 0.005 part |
| p-Menthane hydroperoxide | 0.02 part |

The above components were charged in a 6 l-volume autoclave and allowed to react at 5° C. until a monomer conversion reached 90%. After completion of the reaction, 0.5 part of sodium dimethylthiocarbamate was added to the reaction mixture to stop the polymerization. One part of an alkylated diphenylamine was added to the reaction mixture as a terminator. After any unreacted monomers were removed by steam distillation, aluminum sulfate was added thereto to coagulate the copolymer produced. The solid copolymer was washed with water and dried in a vacuum oven.

REFERENCE EXAMPLES 3 TO 5

Copolymers were obtained in the same manner as in Reference Example 2, except for changing the monomer composition as shown in Table 6.

TABLE 6

| | Reference Example No. | | |
|---|---|---|---|
| Monomer (part) | 3 | 4 | 5 |
| Ethyl Acrylate | 98 | 97 | 98 |
| Dicyclopentenyl acrylate | 2 | — | — |
| Allyl glycidyl ether | — | 2 | — |
| Vinyl acrylate | — | 1 | 2 |

EXAMPLES 17 TO 19

Crosslinkable rubber compositions were prepared in the same process as in Example 1, following a composition ratio shown in Table 7, using AR 101 as an acrylic rubber (II-a) and the copolymer obtained in reference Example 2 as an acrylic rubber (II-b). Results of evaluations are shown in Table 7.

EXAMPLES 20 TO 21

Crosslinkable rubber compositions were prepared in the same process as in Example 1, following a composition ratio shown in Table 7, using an epoxy-containing acrylic rubber ("Nipol AR 51" produced by Japan Geon Co., Ltd.) or a chlorine-containing acrylic rubber ("Noxtite PA 401" produced by NOK Co., Ltd.) as an acrylic rubber (II-a) and the copolymer obtained in Reference Example 2 as an acrylic rubber (II-b). Results of evaluations are shown in Table 7.

EXAMPLES 22 TO 25

Crosslinkable rubber compositions were prepared in the same process as in Example 1, following a composition ratio shown in Table 7, using Nipol AR 51 as an acrylic rubber (II-a) and each of the copolymers obtained in Reference Examples 3 to 5 and a dicyclopentadiene type acrylic rubber ("JSR AR 102" produced by Japan Synthetic Rubber Co., Ltd.) as an acrylic rubber (II-b). Results of evaluations are shown in Table 7.

EXAMPLES 26 TO 27

Crosslinkable rubber compositions were prepared in the same manner as in Example 20, except for changing the proportions of the acrylic rubbers (II-a) and (II-b) as shown in Table 7. Results of evaluations are shown in Table 7.

EXAMPLES 28 TO 29

Crosslinkable rubber compositions were prepared in the same process as in Example 1, following a composition ratio shown in Table 7, using carbon black as a filler. Results of evaluations are shown in Table 7.

EXAMPLES 30 TO 31

Crosslinkable rubber compositions were prepared in the same process as in Example 1, following a composition ratio shown in Table 7, using JSR AR 102 or Nipol AR 51 alone as an organic rubber (II). Results of evaluations are also shown in Table 7.

COMPARATIVE EXAMPLES 12 TO 13

Rubber compounds were prepared according to the composition shown in Table 7, in which JSR AR 102 or Noxtite PA 401 was used as an organic rubber (II), and the polymethylhydrogensiloxane and chloroplatinic acid were not compounded. Results of evaluations are shown in Table 7. It can be seen from Table 7 that the resulting rubber compounds showed bleeding of the polyorganosiloxane and had high brittle temperatures.

COMPARATIVE EXAMPLE 14

A crosslinkable rubber compound was prepared in the same process as in Example 1, following a composition ratio shown in Table 7, raising the polyorganosiloxane/acrylic rubber weight ratio. Results of evaluations are shown in Table 7. In this comparative example, the polyorganohydrogensiloxane underwent reaction to an excessive degree and, as a result, the resulting rubber compound had a powder form.

TABLE 7

| | Example No. | | | | | | | | |
|---|---|---|---|---|---|---|---|---|---|
| | 17 | 18 | 19 | 20 | 21 | 22 | 23 | 24 | 25 |
| Composition (part by wt.): | | | | | | | | | |
| Component (I): | | | | | | | | | |

TABLE 7-continued

| | | | | | | | | | |
|---|---|---|---|---|---|---|---|---|---|
| Silicone Rubber Composition (i) | 30 | 20 | 40 | 30 | 30 | 30 | 30 | 30 | 30 |
| Component (II-a): | | | | | | | | | |
| JSR AR 101 | 60 | 70 | 50 | — | — | — | — | — | — |
| Nipol AR 51 | — | — | — | 60 | — | 60 | 60 | 60 | 60 |
| Noxtite PA 401 | — | — | — | — | 60 | — | — | — | — |
| Component (II-b): | | | | | | | | | |
| Copolymer of Reference Example 2 | 10 | 10 | 10 | 10 | 10 | — | — | — | — |
| Copolymer of Reference Example 3 | — | — | — | — | — | 10 | — | — | — |
| Copolymer of Reference Example 4 | — | — | — | — | — | — | 10 | — | — |
| Copolymer of Reference Example 5 | — | — | — | — | — | — | — | 10 | — |
| JSR AR 102 | — | — | — | — | — | — | — | — | 10 |
| Component (B): | | | | | | | | | |
| Polymethylhydrogensiloxane (ii) | 2 | 2 | 2 | 2 | 2 | 2 | 2 | 2 | 2 |
| Component (C): | | | | | | | | | |
| 1% isopropanol solution of chloroplatinic acid | 0.4 | 0.4 | 0.4 | 0.4 | 0.4 | 0.4 | 0.4 | 0.4 | 0.4 |
| Other Additives | | | | | | | | | |
| Stearic acid | 1 | 1 | 1 | 1 | 1 | 1 | 1 | 1 | 1 |
| Silica*1 | 30 | 30 | 30 | 30 | 30 | 30 | 30 | 30 | 30 |
| Silane coupling agent*2 | 1 | 1 | 1 | — | — | — | — | — | — |
| Silane coupling agent*3 | — | — | — | 1 | 1 | 1 | 1 | 1 | 1 |
| Peroxide ("Percadox 14/40") | 1 | 1 | 1 | — | — | — | — | — | — |
| Crosslinking aid*4 | 1 | 1 | 1 | — | — | — | — | — | — |
| Carbon black*5 | — | — | — | — | — | — | — | — | — |
| Vulcanizing agent ("Vulnoc AB") | — | — | — | 1.5 | — | 1.5 | 1.5 | 1.5 | 1.5 |
| Potassium stearate | — | — | — | — | 1 | — | — | — | — |
| Sodium stearate | — | — | — | — | 2.5 | — | — | — | — |
| Sulfur | — | — | — | — | 0.5 | — | — | — | — |
| Results of Evaluations: | | | | | | | | | |
| Roll Processing Properties (bleeding of polyorganosiloxane) | none | none | none | none | none | none | none | none | none |
| Initial Physical Properties: | | | | | | | | | |
| Tensile Strength (kgf/cm$^2$) | 100 | 120 | 85 | 109 | 100 | 112 | 125 | 110 | 100 |
| Elongation (%) | 280 | 300 | 300 | 330 | 300 | 350 | 320 | 340 | 300 |
| Hardness (JIS A) | 68 | 71 | 70 | 69 | 66 | 71 | 70 | 70 | 68 |
| Aging Properties: | | | | | | | | | |
| Tensile Strength Change (%) | −10 | −12 | −8 | −5 | +3 | −2 | −3 | −5 | −11 |
| Elongation Change (%) | −13 | −15 | −10 | −10 | −10 | −8 | −10 | −12 | −12 |
| Hardness Change (%) | +5 | +6 | +3 | +3 | +4 | +3 | +2 | +3 | +5 |
| Brittle Temperature (°C.) | −52 | −38 | <−60 | −58 | −45 | −58 | <−60 | −60 | −50 |

| | Example No. | | | | | | Comparative Example No. | | |
|---|---|---|---|---|---|---|---|---|---|
| | 26 | 27 | 28 | 29 | 30 | 31 | 12 | 13 | 14 |
| Composition (part by wt.): | | | | | | | | | |
| Component (I): | | | | | | | | | |
| Silicone Rubber Composition (i) | 30 | 30 | 30 | 30 | 30 | 30 | 30 | 30 | 30 |
| Component (II-a): | | | | | | | | | |
| JSR AR 101 | — | — | 60 | — | — | — | — | — | — |
| Nipol AR 51 | 65 | 40 | — | 60 | — | 70 | — | — | — |
| Noxtite PA 401 | — | — | — | — | — | — | — | 70 | — |
| Component (II-b): | | | | | | | | | |
| Copolymer of Reference Example 2 | 5 | 30 | 10 | — | — | — | — | — | 5 |
| Copolymer of Reference Example 3 | — | — | — | 10 | — | — | — | — | — |
| Copolymer of Reference Example 4 | — | — | — | — | — | — | — | — | — |
| Copolymer of Reference Example 5 | — | — | — | — | — | — | — | — | — |
| JSR AR 102 | — | — | — | — | 70 | — | 70 | — | 15 |
| Component (B): | | | | | | | | | |
| Polymethylhydrogensiloxane (ii) | 2 | 2 | 2 | 2 | 2 | 2 | — | — | 2 |
| Component (C): | | | | | | | | | |
| 1% isopropanol solution of chloroplatinic acid | 0.4 | 0.4 | 0.4 | 0.4 | 0.4 | 0.4 | — | — | 0.4 |
| Other Additives | | | | | | | | | |
| Stearic acid | 1 | 1 | 1 | 1 | 1 | 1 | 1 | 1 | 1 |
| Silica*1 | 30 | 30 | — | — | 30 | 30 | 30 | 30 | 30 |
| Silane coupling agent*2 | — | — | — | — | 1 | — | 1 | — | — |
| Silane coupling agent*3 | 1 | 1 | — | — | — | 1 | — | 1 | 1 |
| Peroxide ("Percadox 14/40") | — | — | 1 | — | 1 | — | 1 | — | — |
| Crosslinking aid*4 | — | — | 1 | — | 1 | — | 1 | — | — |
| Carbon black*5 | — | — | 30 | 30 | — | — | — | — | — |
| Vulcanizing agent ("Vulnoc AB") | 1.5 | 1.5 | — | 1.5 | — | 1.5 | — | 1.5 | — |
| Potassium stearate | — | — | — | — | — | — | — | — | — |
| Sodium stearate | — | — | — | — | — | — | — | — | — |
| Sulfur | — | — | — | — | — | — | — | — | — |
| Results of Evaluations: | | | | | | | | | |
| Roll Processing Properties (bleeding of polyorganosiloxane) | none | none | none | none | none | none | bleeding observed | | * |
| Initial Physical Properties: | | | | | | | | | |
| Tensile Strength (kgf/cm$^2$) | 104 | 110 | 120 | 135 | 95 | 105 | 80 | 60 | * |
| Elongation (%) | 340 | 300 | 300 | 320 | 300 | 320 | 310 | 400 | * |

TABLE 7-continued

| | | | | | | | | | |
|---|---|---|---|---|---|---|---|---|---|
| Hardness (JIS A) | 68 | 70 | 70 | 71 | 69 | 71 | 70 | 55 | * |
| Aging Properties: | | | | | | | | | |
| Tensile Strength Change (%) | −6 | −5 | −8 | −2 | −12 | −12 | −13 | −14 | * |
| Elongation Change (%) | −11 | −9 | −10 | −5 | −10 | −9 | −15 | −20 | * |
| Hardness Change (%) | +3 | +4 | +5 | +2 | +5 | +4 | +6 | +6 | * |
| Brittle Temperature (°C.) | −55 | −60 | −50 | −52 | −30 | −29 | −18 | −15 | * |

*The compounded rubber was powdery and did not gather up.
Note:
[1]"Nipsil LP" produced by Nippon Silica Industrial Co., Ltd.
[2]"TSL 8370" produced by Toshiba Silicone Co., Ltd.
[3]"TSL 8350" produced by Toshiba Silicone Co., Ltd.
[4]"Vulnoc PM" produced by Ouchi Shinko Kagaku Kogyo Co., Ltd.
[5]"Seast 3" produced by Tokai Carbon Co., Ltd.

EXAMPLES 32 TO 33

A crosslinkable rubber composition was prepared in the same process as in Example 1, following a composition ratio shown in Table 8, using an epichlorohydrin rubber ("Epichlomer H" produced by Osaka Soda Co., Ltd.) as component (II-a) and an epichlorohydrin rubber ("Epichlomer CG" produced by Osaka Soda Co., Ltd.) as component (II-b). Results of evaluations are shown in Table 8.

EXAMPLE 34

A crosslinkable rubber composition was prepared in the same process as in Example 1, following a composition ratio shown in Table 8, using a chlorosulfonated polyethylene ("Denka CSM 350" produced by Denki Kagaku Kogyo Co., Ltd.) as component (II-a). Results of evaluations are shown in Table 8.

EXAMPLE 35

A crosslinkable rubber composition was prepared in the same process as in Example 1, following a composition ratio shown in Table 8, using a nitrile rubber ("Zetpole 2010" produced by Japan Geon Co., Ltd.) as component (II-a). Results of evaluations are also shown in Table 8.

TABLE 8

| | Example 32 | Example 33 | Example 34 | Example 35 |
|---|---|---|---|---|
| Composition (part by wt.): | | | | |
| Component (I): | | | | |
| Silicone rubber composition (i) | 30 | 30 | 30 | 30 |
| (Component (II-a): | | | | |
| Epichlomer H | 70 | 60 | — | — |
| Denka CSM | — | — | 70 | — |
| Zetpole 2010 | — | — | — | 70 |
| Component (II-b): | | | | |
| Epichromer CG | — | 10 | — | — |
| Component (B): | | | | |
| Polymethylhydrogensiloxane (ii) | 2 | 2 | 2 | 2 |
| Component (C): | | | | |
| 1% isopropanol solution of chloroplatinic acid | 0.4 | 0.4 | 0.4 | 0.4 |
| Other additives: | | | | |
| Stearic acid | 1 | 1 | 1 | 1 |
| Silica ("Nipsil LP") | 30 | 30 | 30 | 30 |
| Silane coupling agent ("TSL 8370") | — | — | 1 | 1 |
| Silane coupling agent ("TSL 8350") | 1 | 1 | — | — |
| Peroxide ("Percadox 14/40") | — | — | 2 | 2 |
| Crosslinking aid ("Vulnoc PM") | — | — | 1 | 1 |
| Vulcanizing agent[*1] | 0.9 | 0.9 | — | — |
| Vulcanization accelerator ("Nocceler D") | 0.3 | 0.3 | — | — |
| Magnesium oxide | 3 | 3 | 3 | — |
| Evaluation Results: | | | | |
| Roll Processing Properties (bleeding of polyorganosiloxane) | none | none | none | none |
| Initial Physical Properties[*2]: | | | | |
| Tensile strength (kg/cm²) | 85 | 102 | 100 | 105 |
| Elongation (%) | 150 | 200 | 380 | 400 |
| Hardness (JIS A) | 78 | 78 | 77 | 78 |
| Aging Properties[*3]: | | | | |
| Tensile strength change (%) | −12 | −12 | 0 | +20 |
| Elongation change (%) | −32 | −25 | −40 | −15 |
| Aging Properties: | | | | |
| Hardness change | +3 | +3 | +8 | +2 |
| Brittleness Temperature (°C.) | −40 | −45 | −48 | −58 |

Note:
[*1]"Zisnet F" produced by Sankyo Kasei Co., Ltd.
[*2]The rubber composition was press vulcanized at 170° C. for 20 minutes and not post cured.
[*3]The rubber composition was aged in a Geer oven at 150° C. for 70 hours.

EXAMPLE 36 AND COMPARATIVE EXAMPLES 15 TO 16

Sixty parts of an acrylic rubber ("JSR AR 101"), 40 parts of the silicone rubber composition (i) as obtained in Reference Example 1, and 5 parts of the linear polymethylhydrogensiloxane (ii) as used in Example 1 were successively charged in a rubber mixer and kneaded at 60° to 80° C. at 60 rpm. When the mixture became uniform, 0.4 part of a 1% isopropanol solution of chloroplatinic acid was kneaded therewith. Then, 1 part of stearic acid, 1 part of an antioxidant ("Noclac CD" produced by Ouchi Shinko Kagaku Kogyo Co., Ltd.), and 30 parts of silica ("Nipsil VN 3") were added thereto. After uniformity was reached, the composition was withdrawn.

The resulting compounded rubber composition was processed by a two-roll rubber mill, and 1 part of an organic peroxide ("Percadox 14/40") and 1 part of a crosslinking agent ("Vulnoc PM") were added thereto to obtain a crosslinkable rubber composition.

The crosslinkable rubber composition was subjected to press vulcanization at 170° C. for 10 minutes under a pressure of 100 to 150 kg/cm² and then to post cure at 175° C. for 4 hours to prepare a 2 mm thick sheet. The sheet was broken after freezing in liquid nitrogen. The average particle size of the dispersed silicone particles was calculated based on the longer diameter of the particles at the break section as observed under an electron microscope and was found to be 0.5 μm (Example 36).

For comparison, a rubber compound was prepared from 100 parts of a commercially available low-temperature resistant type epoxy-containing acrylic rubber ("Nipol AR 42" produced by Japan Geon Co., Ltd.) (Comparative Example 15) or a commercially available standard type epoxy-containing acrylic rubber ("Nipol AR51" produced by Japan Geon Co., Ltd.) (Comparative Example 16), 1 part of stearic acid, 50 parts of HAF carbon black, 1.5 parts of a vulcanizing agent ("Vulnoc AB"), and 1 part of an antioxidant ("Nocrac CD"), and the rubber compound was vulcanized in the same manner as in Example 36, except for changing the vulcanizing time to 20 minutes. Results of evaluations are shown in Table 9.

TABLE 9

|  | Example 36 | Comparative Example 15 | Comparative Example 16 |
|---|---|---|---|
| Initial Physical Properties: |  |  |  |
| Tensile Strength (kgf/cm$^2$) | 100 | 126 | 165 |
| Elongation (%) | 300 | 260 | 300 |
| Hardness (JIS A) | 70 | 68 | 76 |
| Aging Properties*: |  |  |  |
| Tensile Strength Change (%) | −21 | −32 | −48 |
| Elongation Change (%) | −28 | −59 | −11 |
| Hardness Change | +6 | +20 | +15 |
| Brittle Temperature (°C.) | −43 | −27 | −12 |
| Engine Oil Resistance: |  |  |  |
| Tensile Strength Change (%) | −10 | +3 | ±0 |
| Elongation Change (%) | −5 | −15 | −5 |
| Hardness Change | −4 | −2 | +1 |
| Volume Change (%) | +9.8 | +6.4 | +4.9 |

Note: *The sample was aged in a Geer oven at 200° C. for 70 hours.

As can be seen from Table 9, when the samples of Example 36 and comparative Examples 15 and 16 were immersed in engine oil, there was observed no substantial difference in change of physical properties and hardness among these samples, indicating no problem in engine oil additives to the effect of rubber aging. However, making review of heat resistance, and particularly change in hardness that is of importance for use as oil seal material, it is apparent that the rubber composition of Example 36 is greatly superior to the comparative samples. With respect to low-temperature property, too, the rubber composition of Example 36 is much superior to the comparative examples. Accordingly, the rubber composition according to the present invention proves to provide an oil seal material excellent in heat resistance and low-temperature property.

EXAMPLES 37 TO 38 AND COMPARATIVE EXAMPLES 17 TO 20

The same crosslinkable rubber composition as prepared in Example 36 was used as a rubber hose material.

For comparison, a rubber compound for rubber hose was prepared from 100 parts of Nipol AR 42 or Nipol AR 51, 1 part of stearic acid, 50 parts of FEF carbon black, 1.5 parts of Vulnoc AB, and 1 part of Noclac CD. The resulting comparative rubber compound was designated as "low-temperature resistant type acrylic rubber compound" or "standard type acrylic rubber compound", respectively. These rubber composition and rubber compounds were vulcanized in the same manner as in Example 36, except for changing the press vulcanization time to 20 minutes.

These rubber hose materials were evaluated, and the results obtained are shown in Table 10.

TABLE 10

|  | Rubber Composition of the present Invention | Low-Tem. Resistant Acrylic Rubber Compound | Standard Type Acrylic Rubber Compound |
|---|---|---|---|
| Initial Physical Properties: |  |  |  |
| Tensile Strength (kgf/cm$^2$) | 100 | 110 | 150 |
| Elongation (%) | 300 | 260 | 300 |
| Hardness (JIS A) | 70 | 66 | 74 |
| Aging Properties*: |  |  |  |
| Tensile Strength Change (%) | −21 | −30 | −48 |
| Elongation Change (%) | −28 | −57 | −10 |
| Hardness Change | +6 | +18 | +13 |
| Brittle Temperature (°C.) | −43 | −25 | −12 |
| Oil Resistance: |  |  |  |
| Volume Change (%) | +21 | +21 | +14 |

Note: *The samples were aged in a Geer oven at 200° C. for 70 hours.

As is apparent from Table 10, there was observed no substantial difference in oil resistance among these samples. However, in view of heat resistance, and particularly change in hardness that is of importance for use as rubber hose, the rubber composition of the present invention proved greatly superior to the comparative rubber compounds. Further, with respect to low-temperature property, the rubber composition of the present invention is much superior to the comparative samples. It can thus be seen that the rubber composition of the present invention provides rubber hoses excellent in heat resistance and low-temperature resistance.

Rubber hoses composed of inner and outer layers were produced by using the above-described rubber composition of the invention as both inner and outer layers (Example 37), using the above-described rubber composition of the invention as inner layer and an ethylene-acrylic ester copolymer rubber ("VAMAC" produced by E.I. Du Pont de Nemours & Co., Ltd.) as outer layer (Example 38), using the above described low-temperature resistant type acrylic rubber compound as both inner and outer layers (Comparative Example 17), using the above described low-temperature resistant type acrylic rubber compound as inner layer and VAMAC as outer layer (Comparative Example 18), or using the above described standard type acrylic rubber compound as both inner and outer layers (Comparative Example 19), or using the above described standard type acrylic rubber compound as inner layer and VAMAC as outer layer (Comparative Example 20). Each of the resulting rubber hose was evaluated for heat resistance and low-temperature property. The results obtained are shown in Table 11.

TABLE 11

|  | Example No. | | Comparative Example No. | | | |
|---|---|---|---|---|---|---|
|  | 37 | 38 | 17 | 18 | 19 | 20 |
| Heat Resistance | good | good | poor | poor | good | good |
| Low-Temperature Property | good | good | good | good | poor | poor |

As described above, the rubber composition according to the present invention is markedly superior to the conventional rubber compositions in roll processing properties at an unvulcanized stage, and shows no bleed of polyorganosiloxane, and has good molding processability. The vulcanized composition obtained therefrom exhibits excellent characteristics, such as mechanical strength as well as heat resistance, low-temperature property, and oil resistance.

The crosslinkable composition of the present invention are widely applicable, for example, as various belts, hoses, gaskets, boots, rubber vibration insulators, tubes, and the like, and particularly useful as oil seals and rubber hoses. Accordingly, the rubber composition and crosslinkable rubber composition according to the present invention are of high industrial value.

While the invention has been described in greater detail and with reference to specific embodiments thereof, it will be apparent to one skilled in the art that various changes and modifications can be made therein without departing from the spirit and scope thereof.

We claim:

1. A rubber composition obtained by compounding (B) from 0.005 to 50 parts by weight of an polyorganohydrogensiloxane and (C) from 0.00001 to 1 part by weight of a compound of a transition metal belonging to the group VIII with (A) 100 parts by weight of a rubber-forming polymer mainly comprising (I) from 3 to 70% by weight of a polyorganosiloxane represented by the formula:

wherein R represents a substituted or unsubstituted monovalent organic group, 0.02 to 10 mole % of which being a vinyl group; and a represents a number of from 1.900 to 2.004, and having a polymerization degree of from 500 to 10,000 and (II) from 30 to 97% by weight of organic rubber other than (I), and subjecting the resulting composition to hydrosilylation while effecting shear deformation, wherein said composition further comprises a different cross-linking agent for the organic rubber, in addition to component (B), subsequently added.

2. A rubber composition as claimed in claim 1, wherein said organic rubber has a Mooney viscosity (ML$_{1+4}$, 100° C.) of from 10 to 200.

3. A rubber composition as claimed in claim 1 or 2, wherein said organic rubber is selected from the group consisting of an acrylic rubber, an ethylene-α-olefin rubber, an acrylonitrile-butadiene rubber, a fluorinated hydrocarbon rubber, an epichlorohydrin rubber, and a chlorosulfonated polyethylene.

4. A rubber composition as claimed in claim 1, wherein said organic rubber is an acrylic rubber.

5. A rubber composition as claimed in claim 1, wherein said organic rubber comprises a mixture of from 50 to 95% by weight of (II-a) an acrylic rubber having an epoxy group, a halogen atom, a carboxyl group or a crosslinkable group represented by formula (i):

wherein $R^1$, $R^2$, and $R^3$ each represents a hydrogen atom or a monovalent or divalent organic group, and from 5 to 50% by weight of (II-b) an acrylic rubber other than said acrylic rubber (II-a) having a crosslinkable group represented by formula (ii):

wherein $R^4$ represents a methylene group, —O—, —S—,

or —NH—; R represents a substituted or unsubstituted monovalent organic group, and $R^5$, $R^6$, and $R^7$ each represents a hydrogen atom or a mono-, di- or trivalent organic group, and at least two of $R^5$, $R^6$, and $R^7$ are hydrogen atoms, based on the total amount of said acrylic rubbers (II-a) and (II-b).

6. A rubber composition as claimed in claim 1, wherein said transition metal compound is a platinum compound.

7. An oil seal obtained from the rubber composition as claimed in claim 1.

8. A rubber hose obtained from the rubber component as claimed in claim 1.

* * * * *